(12) United States Patent
Baker

(10) Patent No.: US 9,334,840 B2
(45) Date of Patent: May 10, 2016

(54) SERIES PLUS PARALLEL METERING PRESSURE REGULATION SYSTEM FOR A THERMAL EFFICIENT FUEL METERING SYSTEM

(71) Applicant: Carthel C. Baker, Oregon, IL (US)

(72) Inventor: Carthel C. Baker, Oregon, IL (US)

(73) Assignee: Woodward, Inc., Fort Collins, CO (US)

( * ) Notice: Subject to any disclaimer, the term of this patent is extended or adjusted under 35 U.S.C. 154(b) by 263 days.

(21) Appl. No.: 13/946,096

(22) Filed: Jul. 19, 2013

(65) Prior Publication Data

US 2015/0020889 A1     Jan. 22, 2015

(51) Int. Cl.
*F17D 1/00*     (2006.01)
*F02M 37/00*     (2006.01)

(52) U.S. Cl.
CPC ........ *F02M 37/0052* (2013.01); *F02M 37/0029* (2013.01); *Y10T 137/0379* (2015.04); *Y10T 137/2521* (2015.04); *Y10T 137/86002* (2015.04)

(58) Field of Classification Search
CPC ............... Y10T 137/2521; Y10T 137/2514; Y10T 137/2529; Y10T 137/2605; Y10T 137/0379
See application file for complete search history.

(56) References Cited

U.S. PATENT DOCUMENTS

| | | | |
|---|---|---|---|
| 6,095,793 | A | 8/2000 | Greeb |
| 2003/0192300 | A1 | 10/2003 | Mahoney et al. |
| 2010/0089025 | A1 | 4/2010 | Baker |
| 2010/0122535 | A1 | 5/2010 | Finkbeiner |
| 2011/0162724 | A1 | 7/2011 | Kleckler |
| 2012/0045348 | A1 | 2/2012 | Garry |

FOREIGN PATENT DOCUMENTS

EP     0 050 403 A2     4/1982

OTHER PUBLICATIONS

U.S. Appl. No. 13/946,063, filed Jul. 19, 2013, Baker et al.

*Primary Examiner* — R. K. Arundale
(74) *Attorney, Agent, or Firm* — Reinhart Boerner Van Deuren P.C.

(57) ABSTRACT

An engine fuel system and methods are provided. The engine fuel system includes a supply arrangement for providing an outlet flow of fuel to a bypass metering arrangement. The bypass metering arrangement in turn provides a metered flow of fuel to a parallel metering system including a primary regulated circuit and one or more secondary metering circuits. The bypass metering arrangement is operable to maintain a substantially constant pressure differential across a fuel metering valve thereof, as well as provide the metered flow of fuel in response to downstream pressure demands of the parallel metering system.

20 Claims, 4 Drawing Sheets

SERIES PLUS PARALLEL METERING PRESSURE REGULATION SYSTEM FOR A THERMAL EFFICIENT FUEL METERING SYSTEM

FIELD OF THE INVENTION

This invention generally relates to fuel flow systems, and more particularly to parallel metering fuel flow systems in combustion engine applications.

BACKGROUND OF THE INVENTION

Parallel metering systems have been used in many industrial turbine applications. These systems provide accurate fuel placement to multiple combustor locations via multiple metered flow paths arranged in parallel. In such systems, flow is initially provided by one or more pumps. This initial flow is then divided across the multiple metered flow paths arranged in parallel to distribute the same to multiple combustor locations.

As commercial aircraft combustion systems become more complex in order to provide improved fuel efficiency and reduced emissions, the flexibility of a parallel metering system may offer significant benefits. Positive displacement pumps are often preferred for turbine engines due to their good efficiency and high reliability. Parallel metering systems used in industrial turbine engine applications typically include a pressure regulated positive displacement pump that supplies flow to the multiple metered flow paths arranged in parallel. The pump pressure regulation system typically maintains the pump discharge pressure at a constant pressure that is high enough to meet the pressure needs of the metered flow paths for all operating conditions.

Unfortunately, this discharge pressure may be significantly higher than the requirements of the metered flow path. Operating the pump at pressures higher than required leads to undesirable additional pump heat input to the fuel system. Thermal efficient fuel pumping is typically required to meet the aircraft engine operational requirements. Maintaining the positive displacement pump at high pressure for all operating conditions is likely not acceptable for most aircraft engine applications.

Accordingly, there is a need in the art for a parallel metering system that does not require substantially over-sizing the pump and its attendant discharge pressure in an effort to accommodate various systemic pressure demands.

The invention provides such a parallel metering system. These and other advantages of the invention, as well as additional inventive features, will be apparent from the description of the invention provided herein.

BRIEF SUMMARY OF THE INVENTION

The above referenced issues are overcome by including a single bypassing metering system in series with a parallel metering system that includes a primary regulated circuit in parallel with at least one secondary metering circuit. A parallel pressure regulator in the primary regulated circuit of the parallel metering system is referenced to each secondary metering circuit and acts to ensure that sufficient pressure is maintained to supply each secondary metering circuit. The single bypassing metering system upstream of the parallel system meters total fuel flow that is sent to the parallel metering system. The single bypassing fuel metering system regulates the pump discharge pressure to a sufficient pressure to supply the metering and combustion systems by the bypassing positive displacement pump flow in excesses of the system flow demand back to the low pressure inlet of the pump.

In one aspect, an engine fuel system is provided. The engine fuel system includes a supply arrangement including at least one pump for providing an outlet flow of fuel. The system also includes a bypass metering system in fluid communication with the supply arrangement that includes a fuel metering valve and a bypass regulator in fluid communication with an inlet of the fuel metering valve and an inlet of the at least one pump. The bypass regulator is operable to bypass at least a portion of the outlet flow of fuel from the at least one pump back to the inlet of the at least one pump. The system also includes a parallel metering system including a primary regulated circuit and at least two secondary metering circuits arranged in parallel with the primary regulated circuit. The parallel metering system is in fluid communication with the bypass metering system such that it receives a metered flow of fuel from the fuel metering valve of the bypass metering system. The primary regulated circuit includes a primary pressure regulator that is operably connected to the primary regulated circuit and the at least two secondary metering circuits to detect a pressure in each of the primary and at least two secondary metering circuits.

In certain embodiments, the at least one pump of the supply arrangement is a positive displacement pump. In certain embodiments, the at least one pump of the supply arrangement includes two pumps in parallel with one another, and also includes a pump switching system operably connected to each of the two pumps, the pump switching system operable to combine or switch between outlet flows from each of the two pumps to provide the outlet flow of the supply arrangement. The two pumps may each be positive displacement pumps.

In certain embodiments, the bypass regulator is operably connected to an outlet of the fuel metering valve of the bypass metering system to detect a pressure of the metered flow of fuel from the fuel metering valve.

In certain embodiments, each of the at least two secondary metering circuits of the parallel metering system includes a plurality of secondary metering circuits each include a throttling valve and a fuel metering valve regulated by the throttling valve. In certain embodiments, the at least two secondary metering circuits include a fuel metering valve and a throttling valve operably connected to an inlet and an outlet of the fuel metering valve to maintain a substantially constant pressure differential across the fuel metering valve. The primary pressure regulator is operably connected to the at least two secondary metering circuits downstream from the throttling valve.

In certain embodiments, each of the at least two secondary metering circuits include a fuel metering valve and a head regulator operably connected to an inlet and an outlet of the fuel metering valve, and further comprises a throttling valve connected to the outlet of the fuel metering valve and the head regulator to maintain a substantially constant pressure differential across the fuel metering valve.

In certain embodiments, the system also includes a pressurizing and shutoff valve arranged such that the metered flow of fuel from fuel metering valve is directed through the pressurizing and shutoff valve prior to being received by the parallel metering system.

In yet another aspect, an engine fuel system is provided. The engine fuel system includes a supply arrangement including at least one pump for providing an outlet flow of fuel. The system also includes a bypass metering system in fluid communication with the supply arrangement and including a fuel metering valve and a bypass regulator in fluid communication with an inlet of the fuel metering valve and an inlet of the at least one pump and operably connected to an outlet of the fuel metering valve to detect a pressure at the outlet of the fuel metering valve. The bypass regulator is operable to maintain a substantially constant pressure differential across the fuel metering valve. The system also includes a parallel metering system including a primary regulated circuit and at least two secondary metering circuits arranged in parallel with the primary regulated circuit. The parallel metering system is in fluid communication with the bypass metering system such that it receives a metered flow of fuel from the fuel metering valve of the bypass metering system. The primary regulated circuit includes a primary pressure regulator that is operably connected to the primary regulated circuit and the at least two secondary metering circuits to detect a pressure in each of the primary and at least two secondary metering circuits. The primary pressure regulator is operable set an inlet side pressure of the primary pressure regulator at least as high as a highest one of the detected pressures of the primary and at least two secondary metering circuits, plus a regulated pressure value of the primary pressure regulator.

In certain embodiments, the bypass regulator is operable to bypass a portion of the outlet flow of fuel from the at least one pump back to the inlet of the at least one pump. The fuel metering valve is operable to adjust the metered flow of fuel in response to a change in the inlet side pressure of the primary pressure regulator.

In certain embodiments, the at least one pump of the supply arrangement includes two pumps, each of which is a positive displacement pump, and further comprising a pump switching system operably connected to each of the two pumps, the pump switching system operable to combine or switch between outlet flows from each of the two pumps to provide the outlet flow of the supply arrangement.

In certain embodiments, each of the at least two secondary metering circuits includes a fuel metering valve and a throttling valve operably connected to an inlet and an outlet of the fuel metering valve to maintain a substantially constant pressure differential across the fuel metering valve.

In certain embodiments, the at least one secondary metering circuit includes a fuel metering valve and a head regulator operably connected to an inlet and an outlet of the fuel metering valve, and further comprises a throttling valve connected to the outlet of the fuel metering valve and the head regulator to maintain a substantially constant pressure differential across the fuel metering valve.

In yet another aspect, a method for managing a flow of fuel in an engine fuel system having a parallel metering system that includes a primary regulated circuit and at least one secondary metering circuit is provided. The method includes the step of providing a metered flow of fuel to the parallel metering circuit, the metered flow of fuel divided between the primary regulated circuit and at least one secondary metering circuit. The method also includes the step of detecting, with a primary pressure regulator of the primary regulated circuit, a downstream pressure of the primary regulated circuit and a downstream pressure of the at least two secondary metering circuits. The method also includes the step of adjusting an inlet side pressure of the primary pressure regulator to be at least as high as a highest one of the detected downstream pressures of the primary regulated circuit and the at least two secondary metering circuits, plus a regulated pressure value of the primary pressure regulator. The method also includes the step of detecting, with a bypass regulator of a bypass metering system in fluid communication with the parallel metering system, the adjusted inlet side pressure of the primary pressure regulator. The method also includes the step of adjusting an inlet pressure of a flow of fuel to a fuel metering valve of the bypass metering system using the bypass regulator to maintain a substantially constant pressure differential across the fuel metering valve.

In certain embodiments, the method includes the step of adjusting an outlet flow of fuel from the fuel metering valve in response to the adjusted inlet side pressure of the primary pressure regulator.

In certain embodiments, the step of adjusting the pressure of the flow of fuel to the fuel metering valve includes bypassing a portion of an outlet flow of fuel from a positive displacement pump back to an inlet of the positive displacement pump.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
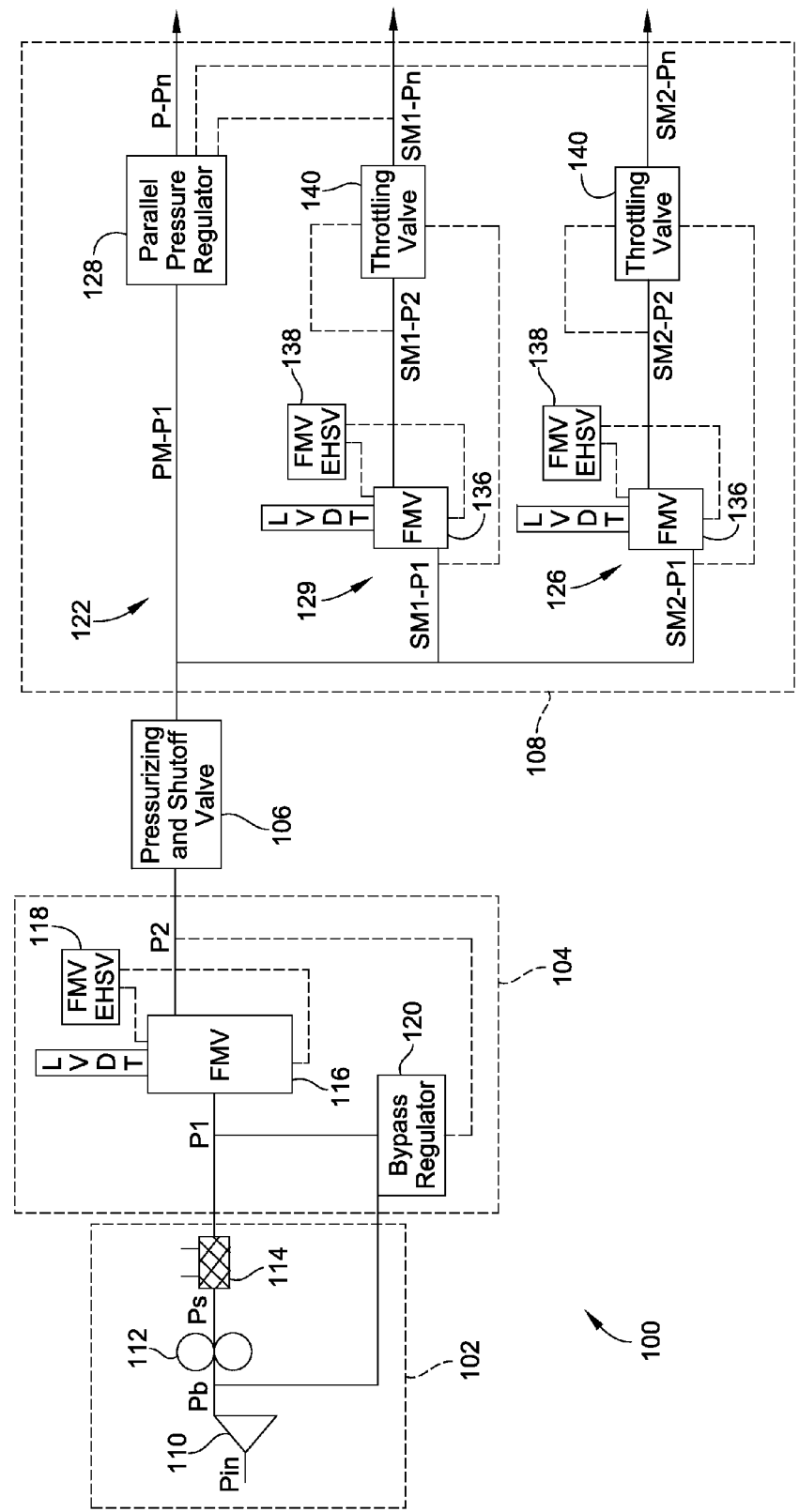
FIG. 1 is a schematic representation of one embodiment of a system according to the teachings of the present invention.

Turning now to the drawings, FIG. 1 illustrates a first exemplary embodiment of a series plus parallel metering pressure regulation system 100. System 100 includes a supply arrangement 102 that supplies a flow of fuel at pressure P1 to a bypass metering system 104. Bypass metering system 104 in turn provides a metered flow of fuel at pressure P2 to a pressurizing and shutoff valve (PSV) 106. Fuel from PSV 106 is received by a parallel metering system 108 that is downstream from PSV 106 as shown for ultimate delivery to various locations in a combustion engine.

Supply arrangement includes a boost pump 110 that provides an initial flow of fuel to a positive displacement pump 112 of supply arrangement 102. Flow delivered to the inlet side of pump 112 is at pressure Pb. Flow from pump 112 is at pressure Ps. Some of this flow is utilized for actuation supply 114 at pressure Psf, with remainder being supplied to the bypass metering system at pressure P1.

Bypass fuel metering system 104 includes a fuel metering valve (FMV) 116 that provides a metered flow of fuel as governed by electro-hydraulic servo valve (EHSV) 118. Bypass fuel metering system 104 also includes a bypass regulator (BPR) 120 that is operably connected to an outlet side of FMV 116 to sense pressure P2, i.e. the pressure of the outlet flow of fuel from FMV 116. BPR 120 may be a proportional, integral, or integral plus proportional control device.

Bypass metering system 104 regulates pump 112 discharge pressure P1 to a sufficient pressure to supply parallel metering system 108 and actuation supply 114 by bypassing pump 112 flow in excess of the necessary parallel metering system 108 flow demand back to the low pressure inlet side of pump 112. BPR 120 senses both the pressure at the inlet and at the discharge of FMV 116 (P1 and P2). BPR 120 acts to regulate P1 to a nearly constant value above P2 by controlling the portion of total pump 112 flow that is allowed to be bypassed back to the low pressure side of pump 112. With the differential pressure (P1-P2) regulated to a nearly constant, the amount of metered flow delivered to parallel metering system 108 becomes directly a function of open FMV 116 port area. Open port area is a function of FMV 116 position, which is fed back to the electronic control system as LVDT position. FMV 116 is positioned to provide the desired open port area by EHSV 118.

Parallel metering system 108 includes a primary regulated circuit 122, and first and second secondary metering circuits 124, 126 arranged in parallel with one another and in parallel with primary regulated circuit 122. Primary regulated circuit 122 and secondary metering circuits 124, 126 divide an input flow of fuel provided by bypass metering system 104.

Primary regulated circuit 122 includes a parallel pressure regulator (PPR) 128 which may be a proportional, integral, or integral plus proportional control device. Secondary metering circuits 124, 126 each include a FMV 136 that provides a metered flow of fuel as governed by EHSV 138. Additionally, a throttling valve (THV) 140 is connected at an outlet side of FMV 136 as illustrated. THV 140 is responsible for regulating the pressure differential across each FMV 136 to a nearly constant value by acting as a variable restriction in series with FMV 136. THV 140 may be a proportional, integral, or proportional plus integral control device.

PPR 128 is connected to each of primary regulated circuit 122 and secondary metering circuits 124, 126 to sense the pressure downstream of each of the three circuits 122, 124, 126. More specifically, PPR senses the downstream pressure P-Pn of primary regulated circuit, the downstream pressure SM1-Pn of first secondary metering circuit 124, and the downstream pressure SM2-Pn of second secondary metering circuit 126. Secondary metering circuits 124, 126 each have a specific required minimum operational pressure differential across the same. PPR 128 maintains the pressure upstream therefrom at PM-P1 at a pressure sufficient enough to maintain the minimum operational pressure differential across each secondary metering circuit 124, 126.

More specifically, because PPR 128 is connected to the downstream pressures P-Pn, SM1-Pn, SM2-Pn, of each circuits 122, 124, 126, it is operable to set PM-P1 equal to the highest of these values, plus an internal regulated pressure of PPR 128. More specifically, PPR 128 will have its own internal regulated pressure value that is added to the highest of P-Pn, SM1-Pn, SM2-Pn to generate the inlet side pressure value PM-P1. In other words, PPR 128 inherently requires a minimum pressure in primary regulated circuit 122 to overcome the regulated pressure value of PPR 128 to hold PPR 128 in an open position relative to primary regulated circuit 122. However, PPR 128 is also connected to secondary metering circuits 124, 126 such that it receives pressures SM1-Pn, SM2-Pn. As a result, to maintain PPR 128 in an open position, the pressure in primary regulated circuit 122 at PPR 128 must be greater than the regulated pressure value plus pressure SM1-Pn, or greater than the regulated pressure value plus pressure SM2-Pn. One example of such a configuration may be a proportional valve biased to a closed condition by its internal spring to close primary regulated circuit 122. Along with this spring force, the pressure SM1-Pn from secondary metering path 124 may also bias this valve closed. As such, the effective pressure at PPR 128 is this pressure SM1-Pn, plus the pressure derived from the internal spring force. A duplicate configuration would also be used for secondary metering path 126. When the pressure in primary regulated circuit 122 is greater than SM1-Pn plus the regulated pressure value and SM2-Pn plus the internal regulated pressure value, the above referenced proportional valves are held open. However, as either of SM1-Pn plus the regulated pressure value, or SM2-Pn plus the regulated pressure valve approach the pressure of in primary regulated circuit 122, this pressure will be reflected at the inlet side of PPR 128.

As one example of such a configuration, PPR 128 may have a regulated pressure value of 30 psi. In other words, PPR 128 may provide a 30 psi pressure differential thereacross, simply by its design by way of the spring force used to hold the proportional valve connected between primary regulated circuit 122 and secondary metering circuit 124, as well as the proportional valve connected between primary regulated circuit 122 and secondary metering circuit 126. PPR 128, due to its connection to downstream pressures P-Pn, SM1-Pn, SM2-Pn, thus adds the highest one of the these downstream pressures to this regulated pressure valve to ultimately provide the inlet side pressure value of PPR 128. As stated above, the regulated pressure value of 30 psi is for exemplary purposes only, and other values are entirely contemplated.

This inlet side pressure PM-P1 of PPR 128 is effectively equal to P2 sensed by BPR 120 assuming known losses through PSV 106, and is also effectively equal to SM1-P1 and SM2-P1 given the parallel configuration of metering circuits 122, 124, 126. BPR 120 is operable increase P1 as fuel is bypassed therethrough to the inlet side of pump 112 based upon this sensed value of P2. As an example, when PPR 128 reflects a downstream pressure change in one of secondary metering circuits 124, 126 as pressure value PM-P1, BPR 128 detects this pressure value, and increases its own restriction to increase P1 as flow is bypassed back to pump 112 to increase pressure P1 to maintain a nearly constant pressure differential across FMV 116. BPR 128 may be a proportional, integral, or proportional plus integral control device to achieve the aforementioned functionality. The amount of metered flow then provided to parallel metering circuit 108 by FMV 116 is adjusted via adjusting the port area of FMV 116 to ensure enough flow is provided to maintain the desired minimum operational pressure drop across each of secondary metering circuits 124, 126.

Figure 2:
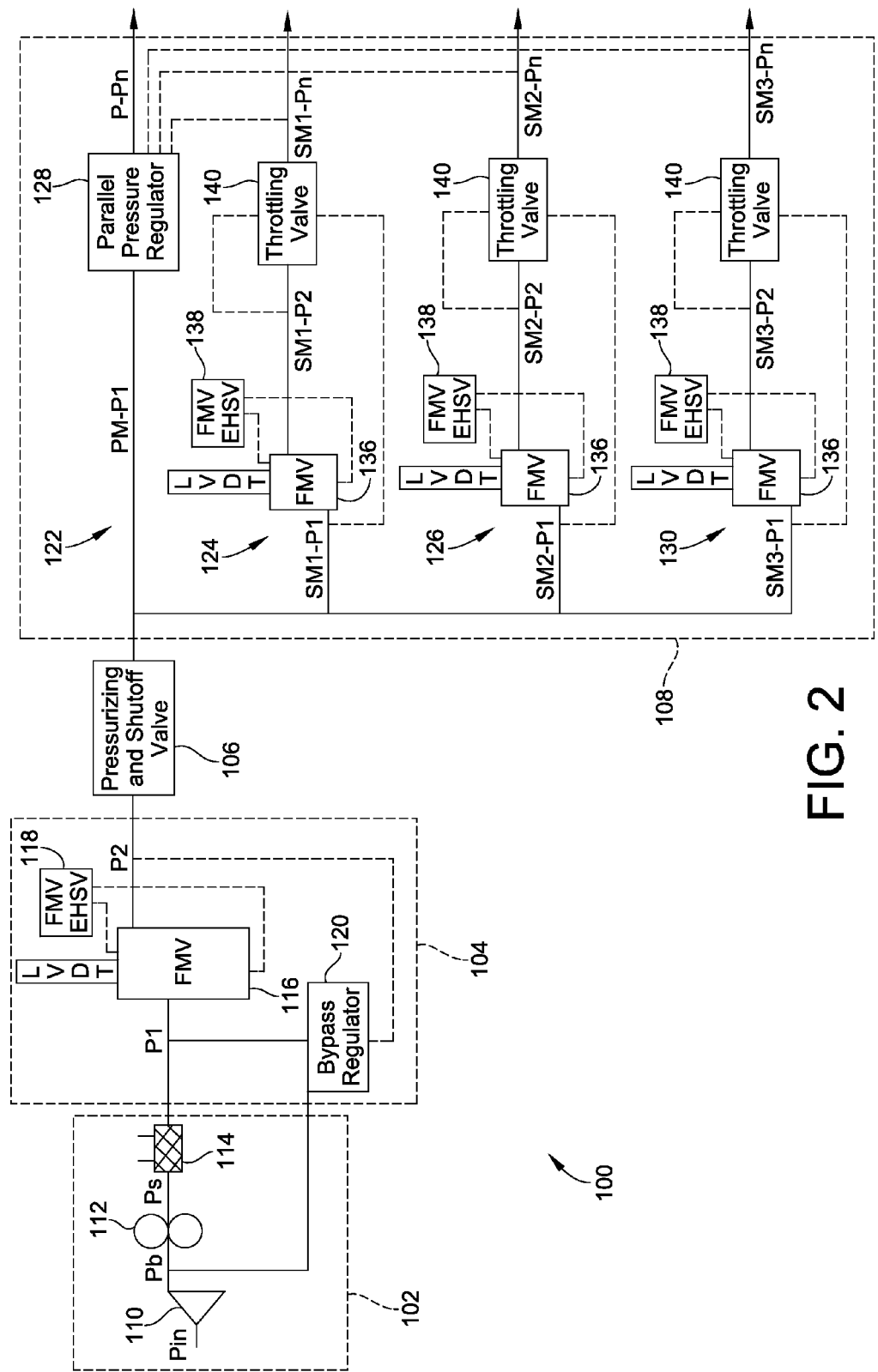
FIG. 2 is a schematic representation of the system of FIG. 1, incorporating additional secondary metering circuits.

FIG. 2 illustrates the flexibility of the above described system 100 inasmuch as parallel metering system 108 may include additional secondary metering circuits, e.g. third secondary metering circuit 130. As can be seen in FIG. 2, PPR 128 also senses the downstream pressure SM3-Pn of third secondary metering circuit 130, and correspondingly sets PM-P1 to an appropriate value based upon the sensed pressure values P-Pn, SM1-Pn, SM2-Pn, SM3-Pn as described above. Those skilled in the art will recognize that system 100 may employ a greater number of secondary metering circuits based upon combustor needs, and the configurations shown herein are for exemplary purposes only.

Figure 3:
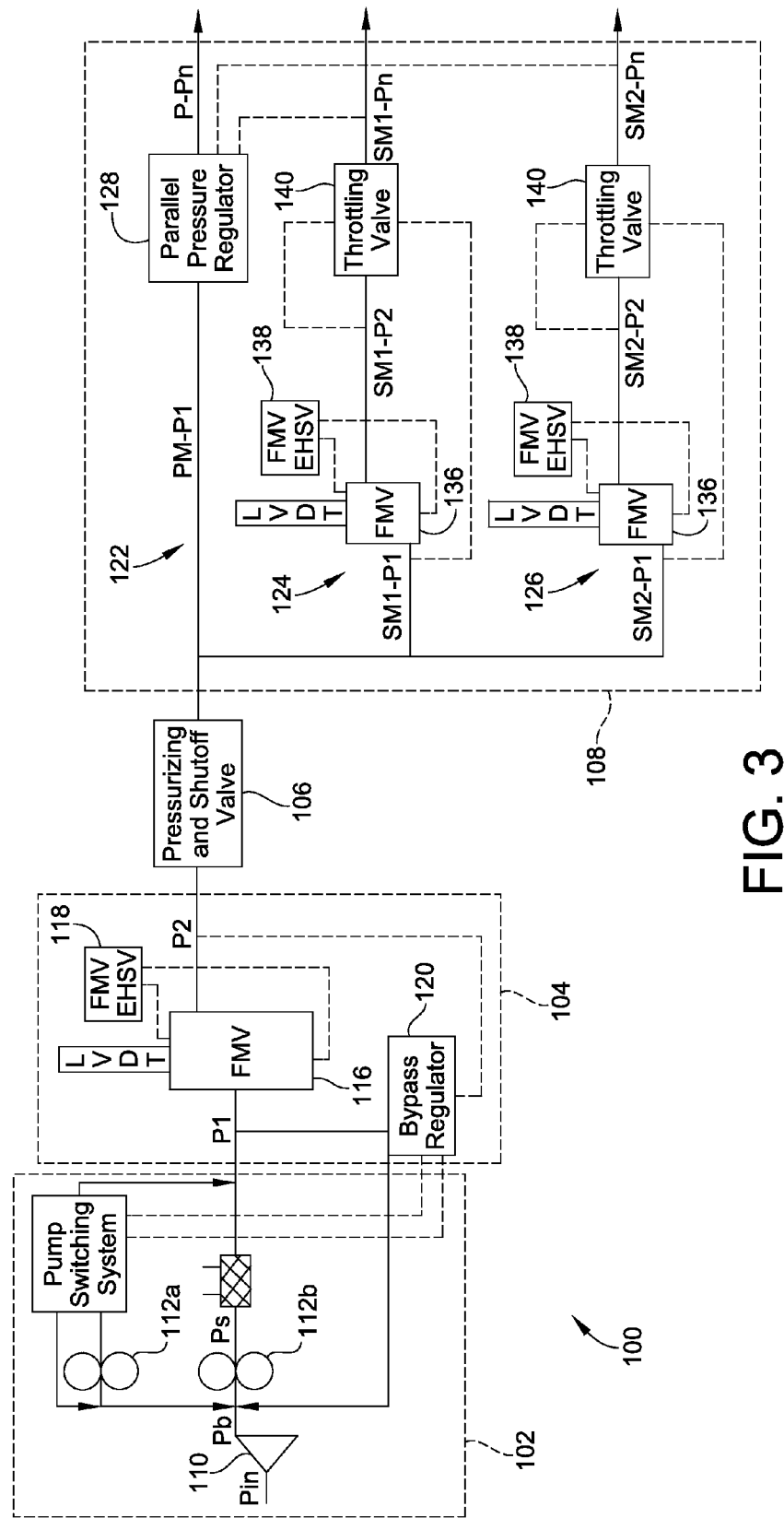
FIG. 3 is a schematic representation of another embodiment of a system according to the teachings of the present invention which includes a dual pump supply arrangement which utilizes a pump switching system.

Turning now to FIG. 3, an alternative embodiment of system 100 is illustrated. This embodiment is similar to the embodiment shown at FIGS. 1 and 2, except that it incorporates a supply arrangement 102 which includes a boost pump 110 and two positive displacement pumps 112a, 112b and a pump switching system 134 for switching between and/or combining the output flows of the pumps 112a, 112b such as that disclosed in U.S. patent application Ser. Nos. 12/683,685 and 12/890,971 assigned to the instant assignee, the disclosures of which are incorporated by reference herein in their entireties. BPR 120 is in operable communication with pump switching system 134 govern the particular flow settings provided by pump switching system 134 to ensure an adequate pressure value P1 is provided to maintain the nearly constant pressure differential across FMV 116. Beyond the foregoing distinction, the embodiment shown in FIG. 3 is functionally the same as that described at FIGS. 1 and 2 above.

Figure 4:
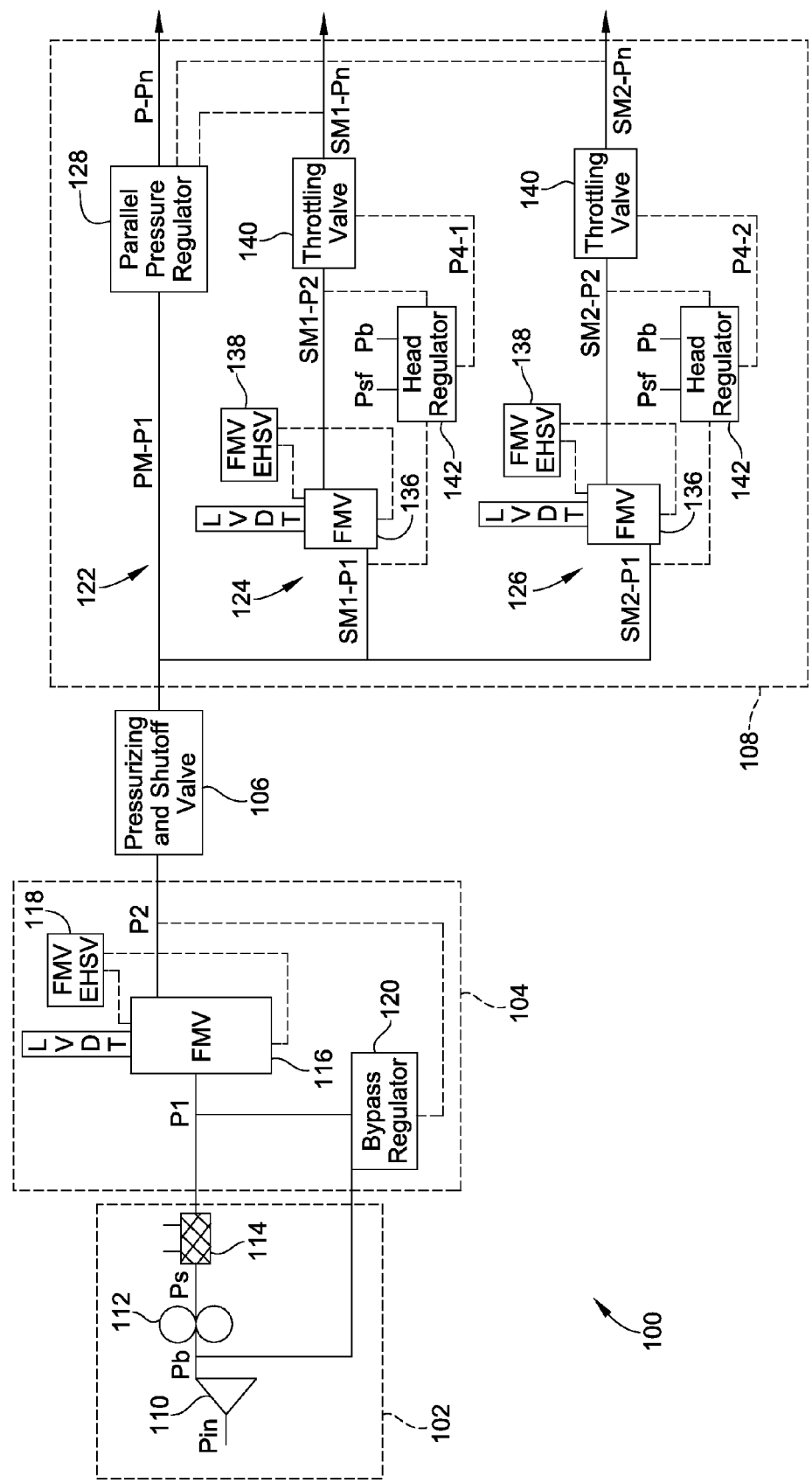
FIG. 4 is a schematic representation of another embodiment of a system according to the teachings of the present invention which includes at least on secondary metering circuit that employs a head regulator.

Turning now to FIG. 4, shows another embodiment of system 100 that, instead of utilizing secondary metering circuits 124, 126 with proportional throttling control via THV's 140 alone, utilizes secondary metering circuits 124, 126 with integrated throttling. In this configuration, instead of positioning THV's 140 directly based on the sensed FMV 136 differential pressure ((SM1-P1)–(SM1-P2) and (SM2-P1)–(SM2-P2)), FMV 136 differential pressure is sensed across head regulator 142. Based on the sensed pressure, head regulator 142 is positioned to regulate the additional supply (Psf) and drain (Pb) pressures to regulate THV 140 control pressure P4-1 and P4-2 to control the position of THV 140 and therefore the restriction created thereby. The combination of the head regulator 142 and THV 140 act to regulate the FMV 136 differential pressure to a nearly constant value. It will be recognized that the embodiment shown in FIG. 4 may include fewer or greater secondary metering circuits, and also incorporate a supply arrangement 102 that includes a dual pump configuration such as that described relative to FIG. 3.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An engine fuel system, comprising:
   a supply arrangement including at least one pump for providing an outlet flow of fuel;
   a bypass metering system in fluid communication with the supply arrangement and including a fuel metering valve and a bypass regulator in fluid communication with an inlet of the fuel metering valve and an inlet of the at least one pump, the bypass regulator operable to bypass at least a portion of the outlet flow of fuel from the at least one pump back to the inlet of the at least one pump;
   a parallel metering system including a primary regulated circuit and at least two secondary metering circuits arranged in parallel with the primary regulated circuit, the parallel metering system in fluid communication with the bypass metering system such that it receives a metered flow of fuel from the fuel metering valve of the bypass metering system, wherein each of the at least two secondary metering circuits includes a throttling valve; and
   wherein the primary regulated circuit includes a primary pressure regulator that is operably connected to the primary regulated circuit and the at least two secondary metering circuits to detect a pressure in the primary regulated circuit and a pressure downstream from the throttling valve of each of the at least two secondary metering circuits.

2. The engine fuel system of claim 1, wherein the at least one pump of the supply arrangement is a positive displacement pump.

3. The engine fuel system of claim 1, wherein the at least one pump of the supply arrangement includes two pumps in parallel with one another.

4. The engine fuel system of claim 3, further comprising a pump switching system operably connected to each of the two pumps, the pump switching system operable to combine or switch between outlet flows from each of the two pumps to provide the outlet flow of the supply arrangement.

5. The engine fuel system of claim 4, wherein the two pumps are positive displacement pumps.

6. The engine fuel system of claim 1, wherein the bypass regulator is operably connected to an outlet of the fuel metering valve of the bypass metering system to detect a pressure of the metered flow of fuel from the fuel metering valve.

7. The engine fuel system of claim 1, further comprising a pressurizing and shutoff valve arranged such that the metered flow of fuel from fuel metering valve is directed through the pressurizing and shutoff valve prior to being received by the parallel metering system.

8. An engine fuel system, comprising:
   a supply arrangement including at least one pump for providing an outlet flow of fuel;
   a bypass metering system in fluid communication with the supply arrangement and including a fuel metering valve and a bypass regulator in fluid communication with an inlet of the fuel metering valve and an inlet of the at least one pump, the bypass regulator operable to bypass at least a portion of the outlet flow of fuel from the at least one pump back to the inlet of the at least one pump;

a parallel metering system including a primary regulated circuit and at least two secondary metering circuits arranged in parallel with the primary regulated circuit, the parallel metering system in fluid communication with the bypass metering system such that it receives a metered flow of fuel from the fuel metering valve of the bypass metering system;

wherein the primary regulated circuit includes a primary pressure regulator that is operably connected to the primary regulated circuit and the at least two secondary metering circuits to detect a pressure in each of the primary and at least two secondary metering circuits; and wherein the at least two secondary metering circuits each include a throttling valve and a fuel metering valve regulated by said throttling valve.

9. An engine fuel system, comprising:

a supply arrangement including at least one pump for providing an outlet flow of fuel;

a bypass metering system in fluid communication with the supply arrangement and including a fuel metering valve and a bypass regulator in fluid communication with an inlet of the fuel metering valve and an inlet of the at least one pump, the bypass regulator operable to bypass at least a portion of the outlet flow of fuel from the at least one pump back to the inlet of the at least one pump;

a parallel metering system including a primary regulated circuit and at least two secondary metering circuits arranged in parallel with the primary regulated circuit, the parallel metering system in fluid communication with the bypass metering system such that it receives a metered flow of fuel from the fuel metering valve of the bypass metering system;

wherein the primary regulated circuit includes a primary pressure regulator that is operably connected to the primary regulated circuit and the at least two secondary metering circuits to detect a pressure in each of the primary and at least two secondary metering circuits; and wherein the at least two secondary metering circuits each include a fuel metering valve and a throttling valve operably connected to an inlet and an outlet of the fuel metering valve to maintain a substantially constant pressure differential across the fuel metering valve.

10. The engine fuel system of claim 9, wherein the primary pressure regulator is operably connected to the at least two secondary metering circuits downstream from the throttling valve.

11. An engine fuel system, comprising:

a supply arrangement including at least one pump for providing an outlet flow of fuel;

a bypass metering system in fluid communication with the supply arrangement and including a fuel metering valve and a bypass regulator in fluid communication with an inlet of the fuel metering valve and an inlet of the at least one pump, the bypass regulator operable to bypass at least a portion of the outlet flow of fuel from the at least one pump back to the inlet of the at least one pump;

a parallel metering system including a primary regulated circuit and at least two secondary metering circuits arranged in parallel with the primary regulated circuit, the parallel metering system in fluid communication with the bypass metering system such that it receives a metered flow of fuel from the fuel metering valve of the bypass metering system;

wherein the primary regulated circuit includes a primary pressure regulator that is operably connected to the primary regulated circuit and the at least two secondary metering circuits to detect a pressure in each of the primary and at least two secondary metering circuits; and wherein the at least two secondary metering circuits include a fuel metering valve and a head regulator operably connected to an inlet and an outlet of the fuel metering valve, and further comprise a throttling valve connected to the outlet of the fuel metering valve and the head regulator to maintain a substantially constant pressure differential across the fuel metering valve.

12. An engine fuel system, comprising:

a supply arrangement including at least one pump for providing an outlet flow of fuel;

a bypass metering system in fluid communication with the supply arrangement and including a fuel metering valve and a bypass regulator in fluid communication with an inlet of the fuel metering valve and an inlet of the at least one pump and operably connected to an outlet of the fuel metering valve to detect a pressure at the outlet of the fuel metering valve, the bypass regulator operable to maintain a substantially constant pressure differential across the fuel metering valve;

a parallel metering system including a primary regulated circuit and at least two secondary metering circuits arranged in parallel with the primary regulated circuit, the parallel metering system in fluid communication with the bypass metering system such that it receives a metered flow of fuel from the fuel metering valve of the bypass metering system; and wherein the primary regulated circuit includes a primary pressure regulator that is operably connected to the primary regulated circuit and the at least two secondary metering circuits to detect a pressure in each of the primary and at least two secondary metering circuits, the primary pressure regulator operable to set an inlet side pressure of the primary pressure regulator at least as high as a highest one of the detected pressures of the primary and at least two secondary metering circuits, plus a regulated pressure value of the primary pressure regulator.

13. The engine fuel system of claim 12, wherein the bypass regulator is operable to bypass a portion of the outlet flow of fuel from the at least one pump back to the inlet of the at least one pump.

14. The engine fuel system of claim 13, wherein the fuel metering valve is operable to adjust the metered flow of fuel in response to a change in the inlet side pressure of the primary pressure regulator.

15. The engine fuel system of claim 12, wherein the at least one pump of the supply arrangement includes two pumps, each of which is a positive displacement pump, and further comprising a pump switching system operably connected to each of the two pumps, the pump switching system operable to combine or switch between outlet flows from each of the two pumps to provide the outlet flow of the supply arrangement.

16. The engine fuel system of claim 12, wherein each of the at least two secondary metering circuits includes a fuel metering valve and a throttling valve operably connected to an inlet and an outlet of the fuel metering valve to maintain a substantially constant pressure differential across the fuel metering valve.

17. The engine fuel system of claim 12, wherein each of the at least two secondary metering circuits includes a fuel metering valve and a head regulator operably connected to an inlet and an outlet of the fuel metering valve, and further comprises a throttling valve connected to the outlet of the fuel metering valve and the head regulator to maintain a substantially constant pressure differential across the fuel metering valve.

18. A method for managing a flow of fuel in an engine fuel system having a parallel metering system that includes a primary regulated circuit and at least two secondary metering circuits, the method comprising the steps of:
  providing a metered flow of fuel to the parallel metering circuit, the metered flow of fuel divided between the primary regulated circuit and at least two secondary metering circuits, wherein each of the at least two secondary metering circuits includes a throttling valve;
  detecting, with a primary pressure regulator of the primary regulated circuit, a downstream pressure of the primary regulated circuit and a downstream pressure of each of the at least two secondary metering circuits, the downstream pressure of each of the at least two secondary metering circuits downstream from the throttling valve of each of the at least two metering circuits;
  adjusting an inlet side pressure of the primary pressure regulator to be at least as high as a highest one of the detected downstream pressures of the primary regulated circuit and the at least two secondary metering circuits, plus a regulated pressure value of the primary pressure regulator;
  detecting, with a bypass regulator of a bypass metering system in fluid communication with the parallel metering system, the adjusted inlet side pressure of the primary pressure regulator; and
  adjusting an inlet pressure of a flow of fuel to a fuel metering valve of the bypass metering system using the bypass regulator to maintain a substantially constant pressure differential across the fuel metering valve.

19. The method of claim 18, further comprising the step of adjusting an outlet flow of fuel from the fuel metering valve in response to the adjusted inlet side pressure of the primary pressure regulator.

20. The method of claim 18, further comprising the step of bypassing a portion of an outlet flow of fuel from a positive displacement pump back to an inlet of the positive displacement pump.

* * * * *